(12) United States Patent
Wu et al.

(10) Patent No.: US 10,704,987 B2
(45) Date of Patent: Jul. 7, 2020

(54) SMART MECHANICAL COMPONENT

(71) Applicant: INDUSTRIAL TECHNOLOGY RESEARCH INSTITUTE, Hsin-Chu (TW)

(72) Inventors: Sung-Yueh Wu, Chiayi County (TW); De-Yau Lin, Tainan (TW); An-Li Chen, Tainan (TW); Ching-Chih Lin, Tainan (TW); Chuan-Sheng Chuang, Tainan (TW); Wei-Chin Huang, Tainan (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 95 days.

(21) Appl. No.: 15/455,559

(22) Filed: Mar. 10, 2017

(65) Prior Publication Data

US 2018/0136153 A1  May 17, 2018

(30) Foreign Application Priority Data

Nov. 15, 2016  (TW) .............................. 105137318 A

(51) Int. Cl.
  *G01M 13/00*  (2019.01)
  *F16B 31/06*  (2006.01)
  *F16B 45/00*  (2006.01)

(52) U.S. Cl.
  CPC ............. *G01M 13/00* (2013.01); *F16B 31/06* (2013.01); *F16B 45/00* (2013.01)

(58) Field of Classification Search
  CPC ...... G01N 27/028; G01M 13/00; F16B 35/00; F16B 45/00
  See application file for complete search history.

(56) References Cited

U.S. PATENT DOCUMENTS 3,085,182 A   4/1963 Napolin
5,945,892 A * 8/1999 Kato .................... H03H 7/0115
                                              333/185

(Continued)

FOREIGN PATENT DOCUMENTS

CN    102683773 A    9/2012
CN    103743503 A    4/2014

(Continued)

OTHER PUBLICATIONS

Intellectual Property Office Ministry of Economic Affairs, R.O.C., "Office Action", dated Jul. 26, 2017, Taiwan.

(Continued)

*Primary Examiner* — Akm Zakaria
(74) *Attorney, Agent, or Firm* — Locke Lord LLP; Tim Tingkang Xia, Esq.

(57) ABSTRACT

A smart mechanical component has a mechanical part main body; a mechanical part secondary body located inside of the mechanical part main body; a three dimensional three-dimensional (3-D) reserved space located between the mechanical part main body and the mechanical part secondary body; at least one connecting unit connecting the mechanical part main body and the mechanical part secondary body; wherein the mechanical part main body, the mechanical part secondary body and the three dimensional three-dimensional (3-D) reserved space form a capacitor; the connecting unit forms an inductor; the inductor and the capacitor forms an inductor-capacitor circuit.

20 Claims, 14 Drawing Sheets

(56) References Cited

U.S. PATENT DOCUMENTS

| | | | |
|---|---|---|---|
| 6,025,725 | A | 2/2000 | Gershenfeld et al. |
| 6,910,385 | B2 | 6/2005 | Shkel |
| 7,181,975 | B1 | 2/2007 | Bradley et al. |
| 7,290,454 | B2 | 11/2007 | Liu |
| 7,726,199 | B2 | 6/2010 | Shkel et al. |
| 8,104,358 | B1 | 1/2012 | Jia et al. |
| 8,259,076 | B2 | 9/2012 | Trent, Jr. et al. |
| 8,364,419 | B2 | 1/2013 | Potyrailo et al. |
| 8,443,676 | B2 | 5/2013 | Burghardt et al. |
| 8,493,187 | B2 | 7/2013 | Rowland et al. |
| 8,601,880 | B2 | 12/2013 | Berkcan et al. |
| 8,984,952 | B2 | 3/2015 | Barron et al. |
| 9,038,483 | B2 | 5/2015 | Nagarajan et al. |
| 9,291,586 | B2 | 3/2016 | Neikirk et al. |
| 9,305,456 | B2 | 4/2016 | Rowland et al. |
| 9,457,517 | B2 | 10/2016 | Cheng et al. |
| 9,533,350 | B2 | 1/2017 | Zhuang et al. |
| 2003/0030510 | A1* | 2/2003 | Sasaki .................. H03H 7/0115 333/185 |
| 2009/0009276 | A1* | 1/2009 | Jidaisho ................ H01F 27/027 336/90 |
| 2010/0259282 | A1* | 10/2010 | Niwa .................. H03K 17/9505 324/655 |
| 2015/0109074 | A1* | 4/2015 | Son ...................... H03H 7/0115 333/185 |
| 2015/0147722 | A1 | 5/2015 | Tsai et al. |
| 2015/0150614 | A1 | 6/2015 | Tsai et al. |
| 2015/0174822 | A1 | 6/2015 | Huang et al. |
| 2016/0103084 | A1* | 4/2016 | Kleczewski ........... B65G 17/08 324/652 |
| 2016/0114531 | A1 | 4/2016 | Chuang et al. |
| 2016/0128843 | A1 | 5/2016 | Tsau et al. |
| 2016/0184925 | A1 | 6/2016 | Huang et al. |

FOREIGN PATENT DOCUMENTS

| | | |
|---|---|---|
| CN | 204330987 U | 5/2015 |
| CN | 104665905 A | 6/2015 |
| CN | 104665906 A | 6/2015 |
| CN | 104665913 A | 6/2015 |
| CN | 205487870 U | 8/2016 |
| TW | I374265 A | 10/2012 |
| TW | I414762 B | 11/2013 |
| TW | I442903 B | 7/2014 |
| TW | 201519852 A | 6/2015 |
| TW | I536955 B | 6/2016 |
| TW | I545269 B | 8/2016 |
| TW | I547258 B | 9/2016 |
| TW | I548390 B | 9/2016 |

OTHER PUBLICATIONS

Eric Macdonald et al., 3D Printing for the Rapid Prototyping of Structural Electronics, IEEE Access, 2014, 234-242, vol. 2.

Sung-Yueh Wu et al., 3D-printed microelectronics for integrated circuitry and passive wireless sensors, Microsystems & Nanoengineering, 2015.

Sung-Yueh Wu et al., A wirelessly readable and resettable shock recorder through the integration of LC circuits and MEMS devices, Smart Materials and Structures, 2014, 23.

Jennifer A. Lewis et al., Three-dimensional printed electronics, Nature, 2015, vol. 518.

K.G. Ong et al., Design and application of a wireless, passive, resonant-circuit environmental monitoring sensor, Sensors and Actuators A: Physical, 2001, 33-43, vol. 93.

China Patent Office, "Office Action", dated Jun. 3, 2019, China.

* cited by examiner

SMART MECHANICAL COMPONENT

CROSS REFERENCE TO RELATED APPLICATION

This application also claims priority to Taiwan Patent Application No. 105137318 filed in the Taiwan Patent Office on Nov. 15, 2016, the entire content of which is incorporated herein by reference.

TECHNICAL FIELD

The present disclosure relates to a smart mechanical component, and more particularly, to a mechanical component capable of determining if the mechanical component needs to be replaced by the detection of a resonance effect from an inductor-capacitor (LC) circuit built inside the mechanical component.

BACKGROUND

Screws, bolts, screw rods or hooks are the most basic and most important mechanical parts, which are used in aerospace, medical, heavy industry or people's livelihood industry. However, in the long-term use, they are proned to damage by fatigue, stretching, bending, extrusion or fracture.

Generally, there is no sensor that is designed to build inside those essential parts for damage detection. The most common way used in the industry for achieving such damage detection is by installing an addition sensor, which can be extremely inconvenient to use. In addition, those additional sensors may require to be replaced in a regular base or may not be replaced until themselves are damaged. However, there are some working environments where even a simple condition caused by damaged part is not allowed, such as aircrafts, nuclear power plants, chemical factories, heavy-duty machineries, harbors, or power plants.

SUMMARY

In an embodiment, the present disclosure provides a smart mechanical component, comprising:
a main body;
a secondary body, arranged inside of the main body;
a three-dimensional (3-D) reserved space, formed between the main body and the secondary body; and
at least one connecting unit, for connecting the main body and the secondary body;
wherein, the main body, the secondary body and the three-dimensional (3-D) reserved space form a capacitor, and the at least one connecting unit forms an inductor, while enabling the inductor and the capacitor to form an LC circuit.

In another embodiment, the present disclosure provides a smart mechanical component, comprising:
 a secondary body;
 a main body, arranged boring through the second body; and
 a connecting unit, for connecting the main body and the secondary body;
 wherein, there is a three-dimensional (3-D) reserved space formed between the main body and the secondary body, while allowing the three-dimensional (3-D) reserved space to be disposed at a position between the connecting unit and the secondary body; and the secondary body, the main body and the three-dimensional (3-D) reserved space form a capacitor, and the connecting unit forms an inductor, while enabling the inductor and the capacitor to form an LC circuit.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1A:
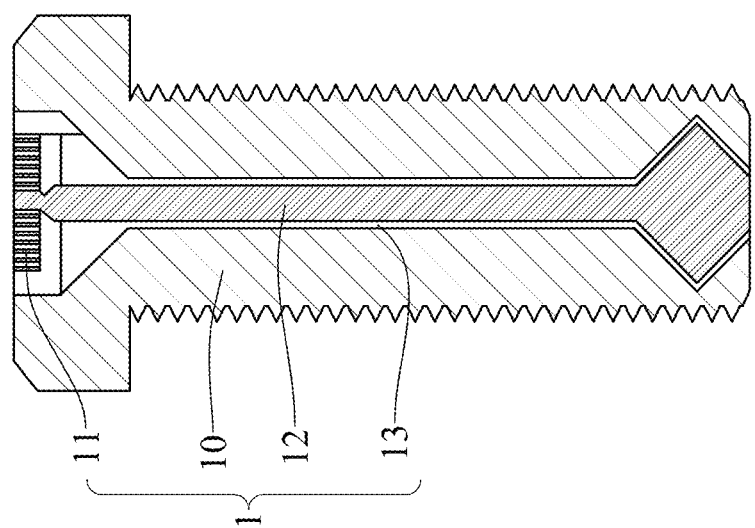
FIG. 1A is a sectional view of a smart mechanical component according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
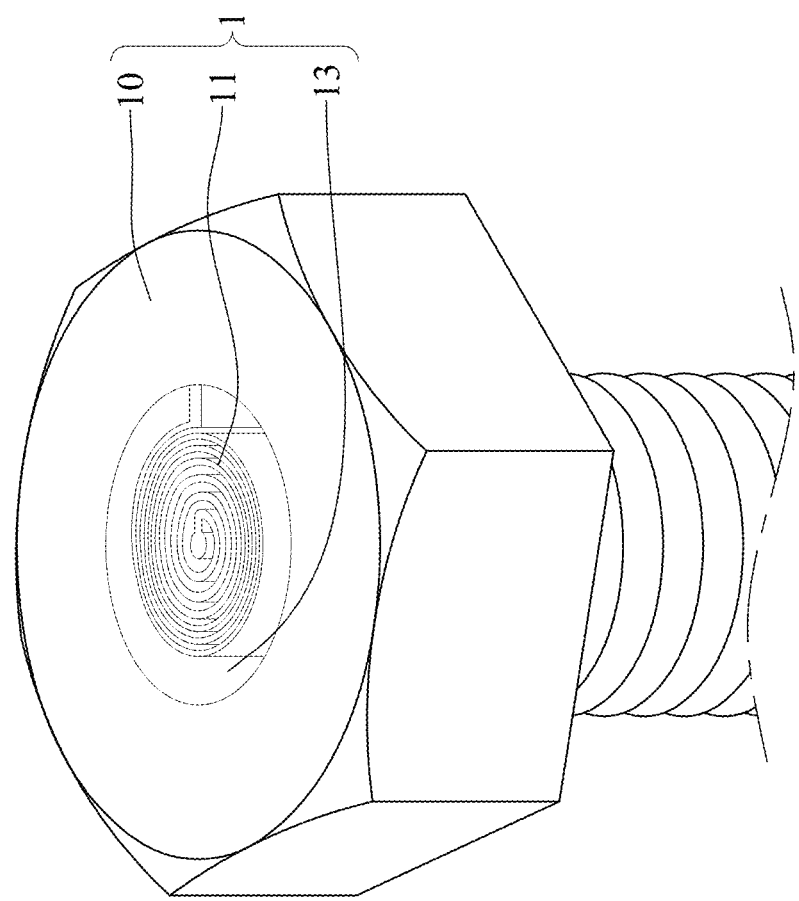
FIG. 1B is a partial view of a connecting unit used in the present disclosure.

Please refer to FIG. 1A and FIG. 1B, which are schematic diagrams showing a sectional view and a partial view of a smart mechanical component according to a first embodiment of the present disclosure. In FIG. 1A and FIG. 1B, a smart mechanical component is disclosed, which comprises: a main body 10, at least one connecting unit 11, and at least one secondary body 12.

The secondary body 12 is disposed inside the main body 10, while allowing a three-dimensional (3-D) reserved space 13 to be formed between the secondary body 12 and the main body 10. Thereby, the assembly of the main body 10, the secondary body 12 and the three-dimensional (3-D) reserved space 13 forms a capacitor. It is noted that main body 10 can be a screw or a bolt.

The connecting unit 11 is used for connecting the secondary body 12 to the main body 10, while allowing the connecting unit 11 to act like an inductor. By the cooperation between the aforesaid capacitor and the inductor, an LC circuit1 is achieved.

In this embodiment, the main body 10, the secondary body 12 and the connecting unit 11 are integrally formed or are laminated together. In addition, either there can be a film being formed on the surfaces of the main body 10, the secondary body 12 and the connecting unit 11, or it is possible to modify the material of the main body 10, the secondary body 12 and the connecting unit 11 for enhancing the their conductivity or structure strength.

Moreover, there can be a magnetic material disposed surrounding the secondary body 12, and also the three-dimensional (3-D) reserved space 13 can be filled or partially filled with a dielectric material. Operationally, the size of the three-dimensional (3-D) reserved space 13, that is, the distance measured between the secondary body 12 and the main body 10, is designed to be adjustable by the driving of an external force or by the use of an regulator.

Figure 2:
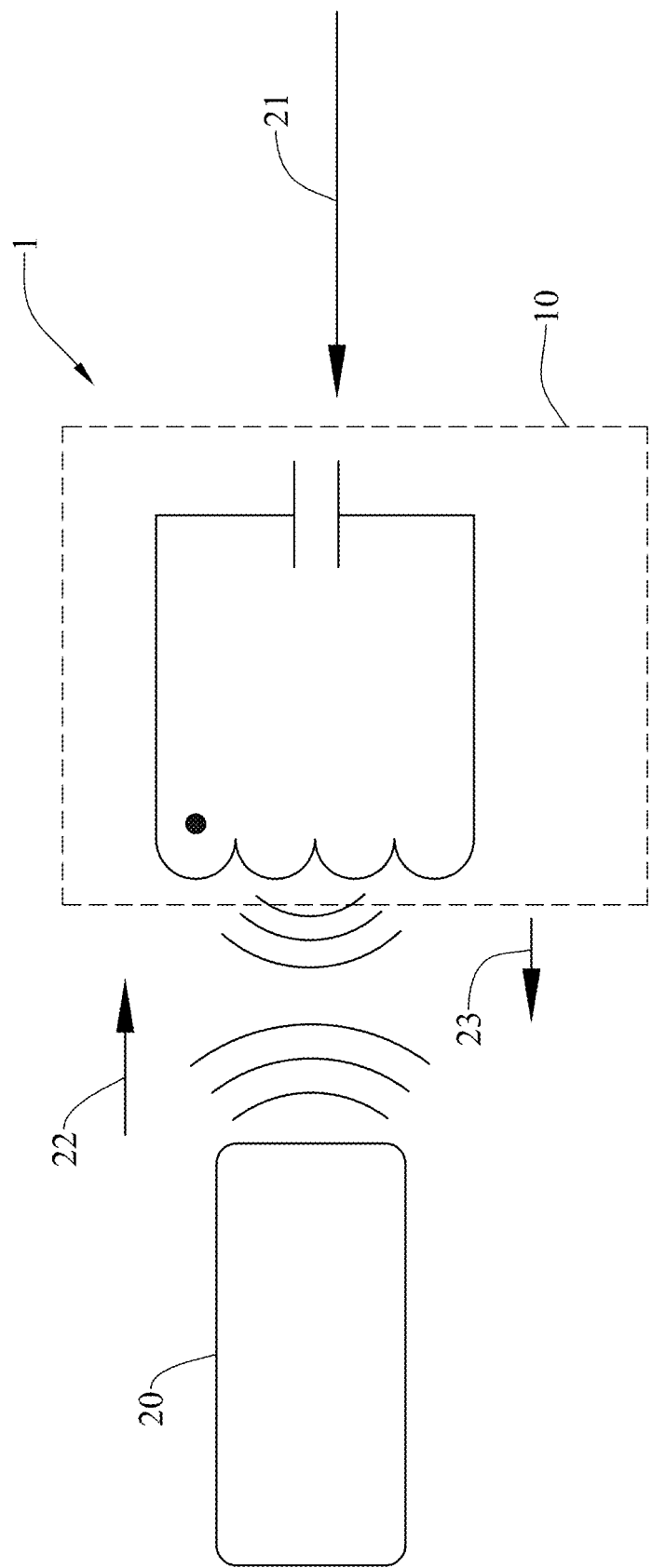
FIG. 2 is a schematic diagram showing the sign communication between a signal reader and a smart mechanical component of the present disclosure.

In FIG. 2, a reader 20 is provided, which is composed of a frequency scanner and a radiofrequency coil and is used for reading the aforesaid LC circuit1. Operationally, when an external force 21 is exerted upon the main body 10, the reader 20 will be activated to fed an energy 22 to the LC circuit1 for enabling the LC circuit1 to response back a reflection energy 23 to be detected by the reader 20, and then the reader 20 is able to proceed with a signal process operation for obtaining a resonance frequency of the LC circuit1 while accordingly obtaining the deformation of the main body 10 or the magnitude of the external force 21.

Figure 3:
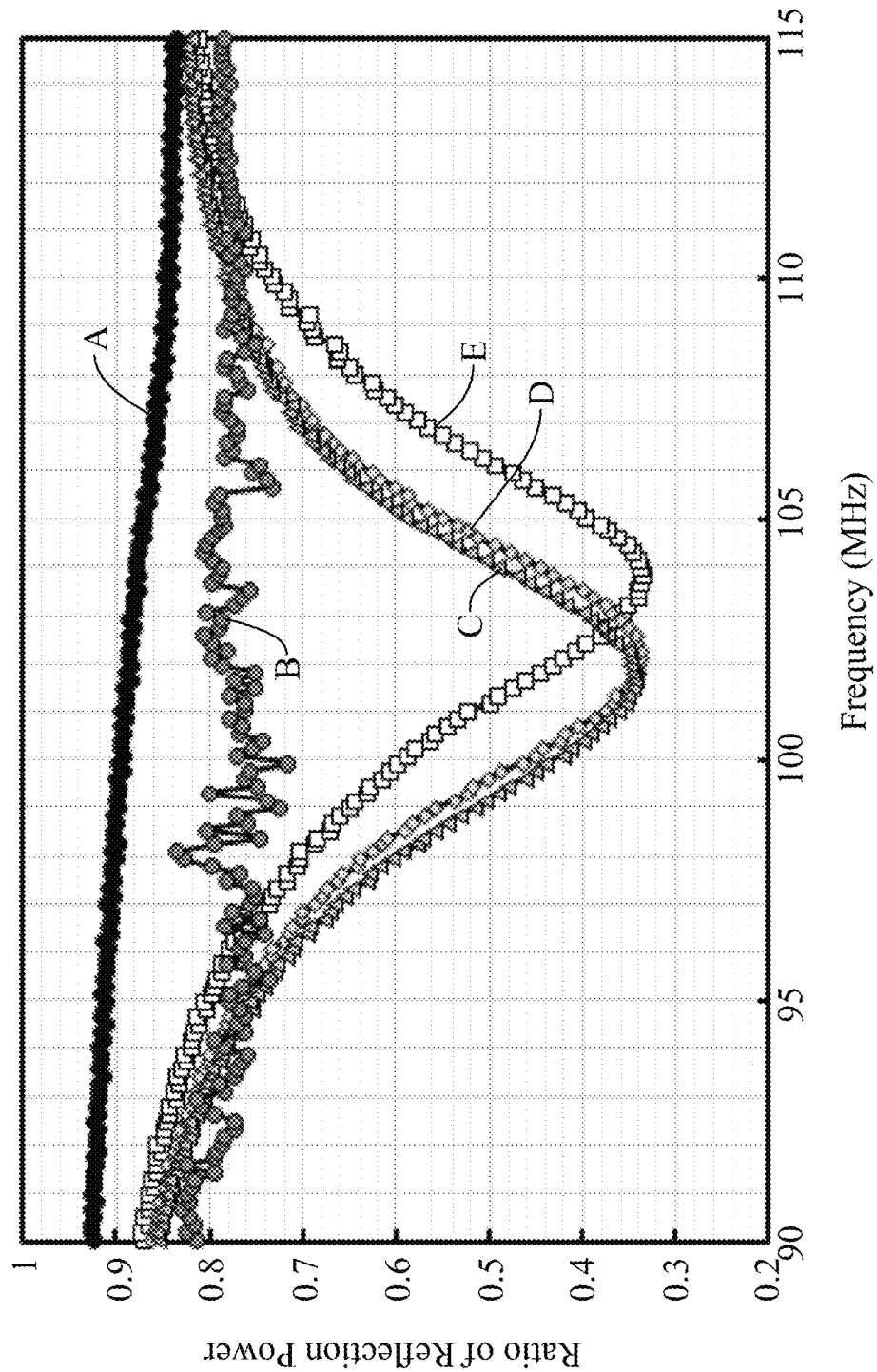
FIG. 3 is a schematic diagram showing the relationship between frequency and magnitude resonance frequency in a smart mechanical component of the present disclosure.

In FIG. 3, Curve A represents the signals detected by the reader 20 when the reader 20 is not being positioned near the smart mechanical component, and consequently the corresponding reflection energy 23 may be too minute to be detected so that there can be no resonance frequency being detected and measured.

On the other hand, Curve E represents a situation that there is no external force 21 existed and the reader is positioned within a proper distance near the smart mechanical component with a tip displacement of 0 mm, by that the resonance frequency being detected is about 104 MHz.

Curve D represents another situation that there is an external force 21 existed and the reader is positioned within a proper distance near the smart mechanical component with a tip displacement of 0.2 mm, by that the resonance frequency being detected is about 102 MHz.

Curve C represents another situation that there is an external force 21 existed and the reader is positioned within a proper distance near the smart mechanical component with a tip displacement of 0.4 mm, by that the resonance frequency being detected is about 101.5 MHz.

Curve D represents another situation that there is an external force 21 existed and the reader is positioned within a proper distance near the smart mechanical component with a tip displacement of 0.6 mm, by that the resonance frequency is not detectable as the tip displacement is too large.

As disclosed in the aforesaid Curve A to Curve E, it can be concluded that the main body 10 is engaged with the secondary body 12 when the tip displacement is 0.6 mm as the so-formed capacitor is short-circuited for enabling the resonance frequency of the LC circuit1 to be destroyed. Thereby, the deformation of the smart mechanical component can be determined according to the variation of the resonance frequency or the short-circuit condition.

Figure 4:
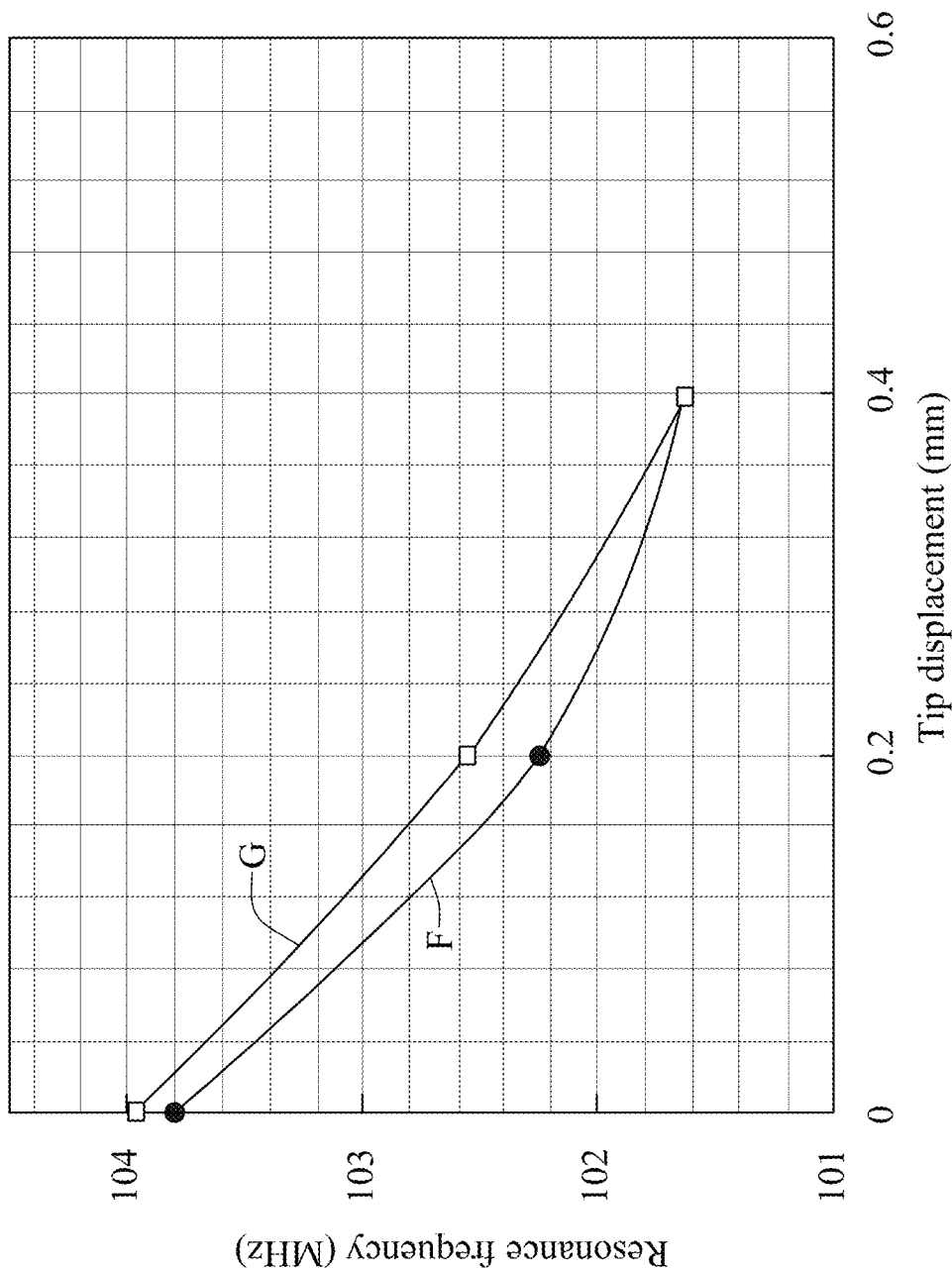
FIG. 4 is a schematic diagram showing the relationship between tip displacement and resonance frequency in a smart mechanical component of the present disclosure.

FIG. 4 is a schematic diagram showing the relationship between tip displacement and resonance frequency in a smart mechanical component of the present disclosure. As shown in the Curve A of FIG. 4, the tip displacement is increase with the increasing of a side-way external force, and correspondingly the resonance frequency is decreasing. On the other hand, Curve G shows that the tip displacement is decrease with the decreasing of the side-way external force, and correspondingly the resonance frequency is increasing.

Figure 5:
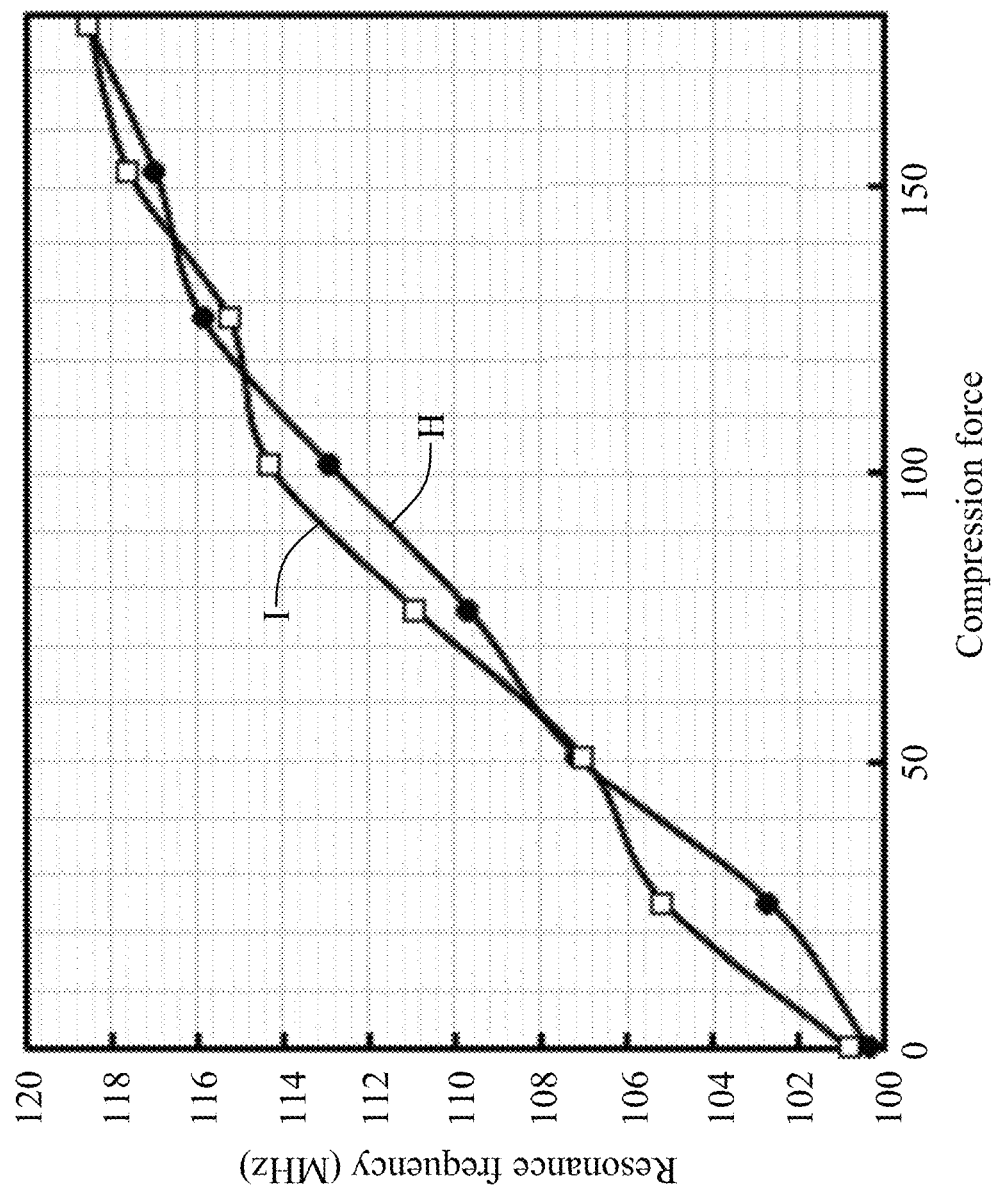
FIG. 5 is a schematic diagram showing the relationship between compression force and resonance frequency in a smart mechanical component of the present disclosure.

FIG. 5 is a schematic diagram showing the relationship between compression force and resonance frequency in a smart mechanical component of the present disclosure. As shown in the Curve I of FIG. 5, the tip displacement is subjected to an increasing compression force, and correspondingly the resonance frequency is increasing with the increasing compression force, whereas the Curve H shows the vice versa.

Figure 6:
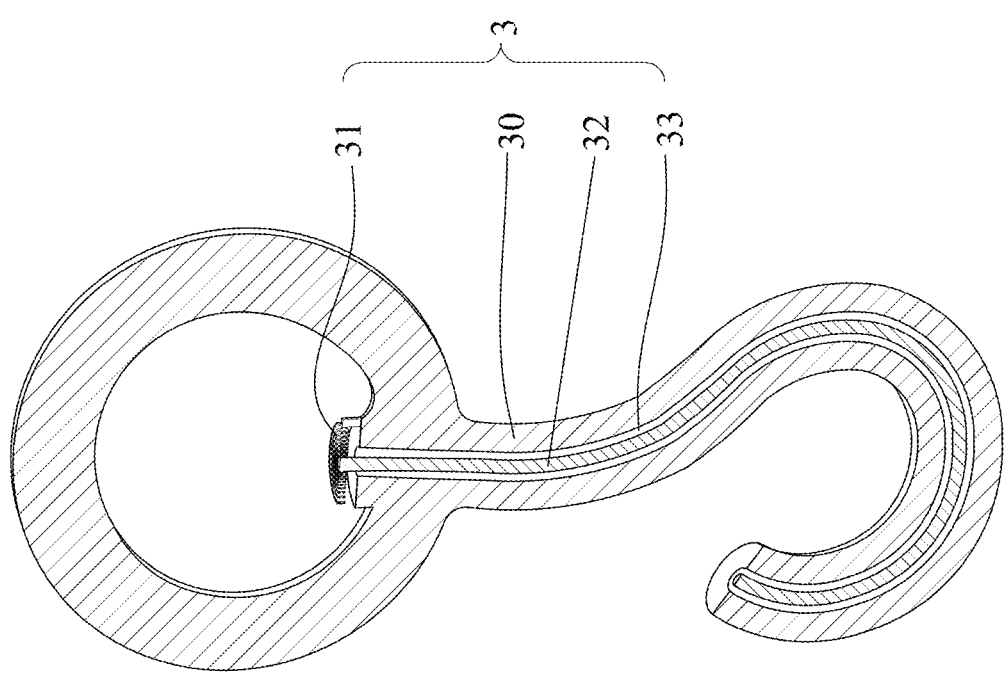
FIG. 6 is a sectional view of a smart mechanical component according to a second embodiment of the present disclosure.
Figure 7:
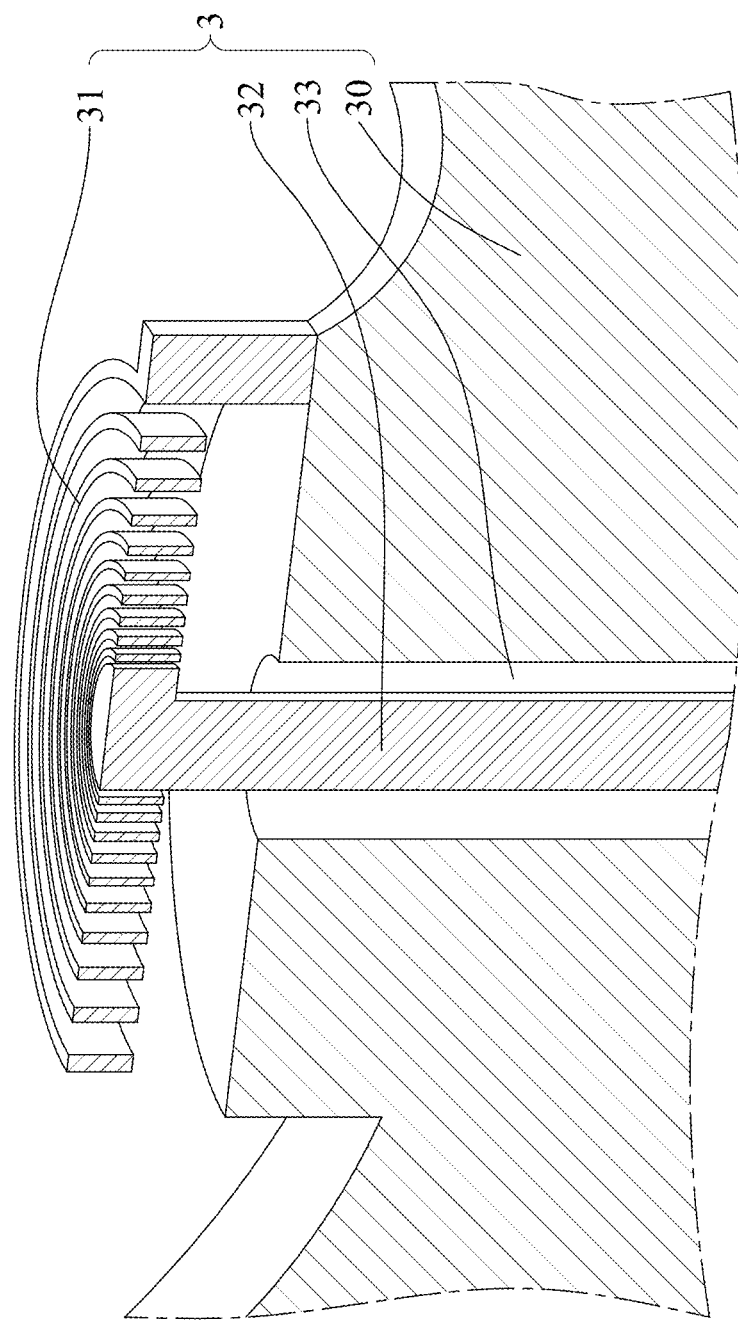
FIG. 7 is a partial sectional view of the smart mechanical component according to the second embodiment of the present disclosure.

Please refer to FIG. 6 and FIG. 7, which are schematic diagrams showing a sectional view and a partial view of a smart mechanical component according to a second embodiment of the present disclosure. In this second embodiment, the smart mechanical component is comprised of: a main body 30, at least one connecting unit 31 and a secondary body 32.

The secondary body 32 is disposed inside the main body 30 while allowing a three-dimensional (3-D) reserved space 33 to be formed between the main body 30 and the secondary body 32, and thereby a capacitor can be achieved from the assembly of the main body 30, the secondary body 32 and the three-dimensional (3-D) reserved space 33. In the second embodiment, the main body 30 is a hook.

The connecting unit 31 that is provided for connecting the secondary body 32 to the main body 30 is substantially an inductor itself that is to be used cooperatively with the aforesaid capacitor to construct an LC circuit3.

Figure 8:
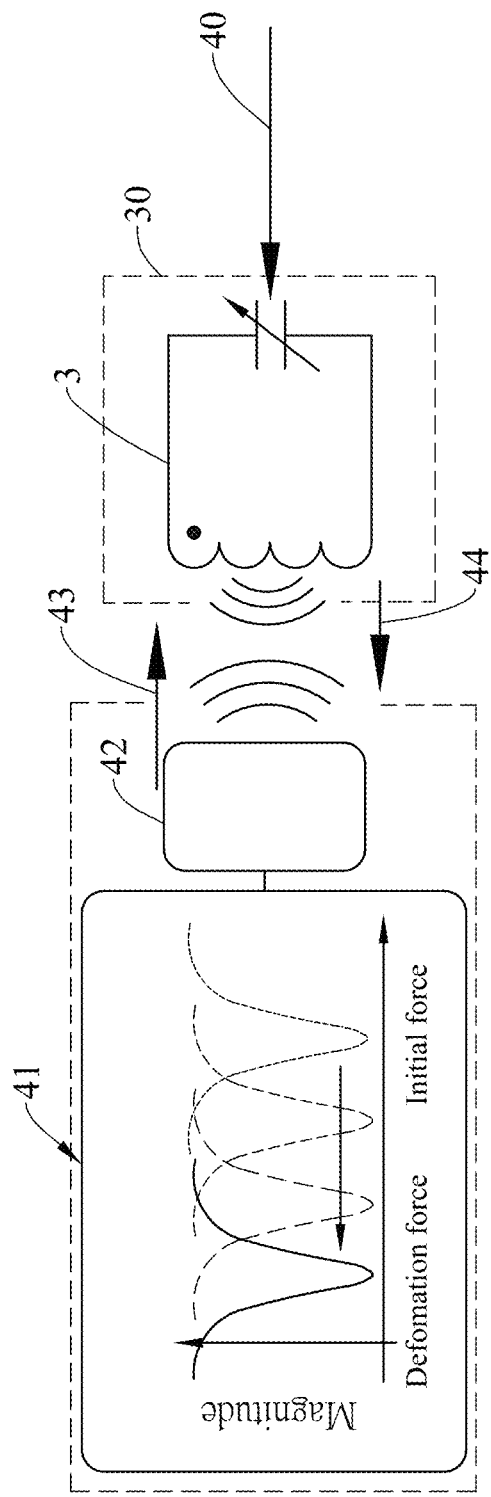
FIG. 8 is a schematic diagram showing the sign communication between a signal reader and the smart mechanical component of the second embodiment.

In FIG. 8, a reader is provided, which is composed of a frequency scanner 41 and a radiofrequency coil 42. The frequency scanner 41 is enabled to provide an energy 43 to the main body 30 via the radiofrequency coil 42. Operationally, when an external force 40 is exerted upon the main body 30, the reader 20 will be activated to fed the energy 43 to the LC circuit3 for enabling the LC circuit1 to response back a reflection energy 44 carrying resonance frequency information of the LC circuit3 to be detected by the frequency scanner 41 of the reader. Similar to those disclosed in FIG. 3 to FIG. 5, the variation of resonance frequency that is disclosed in FIG. 6 also indicates that the smart mechanical component is deformed by the external force, and when the resonance frequency can no longer be detected, it represents that the deform of the smart mechanical component is too large that the smart mechanical component is damaged.

Figure 9A:
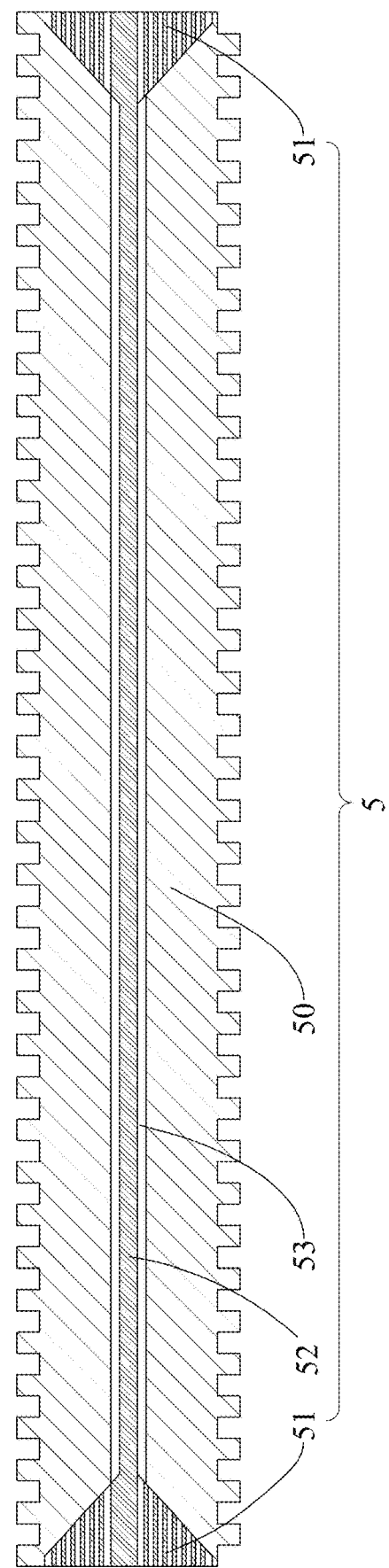
FIG. 9A is a sectional view of a smart mechanical component according to a third embodiment of the present disclosure.
Figure 9B:
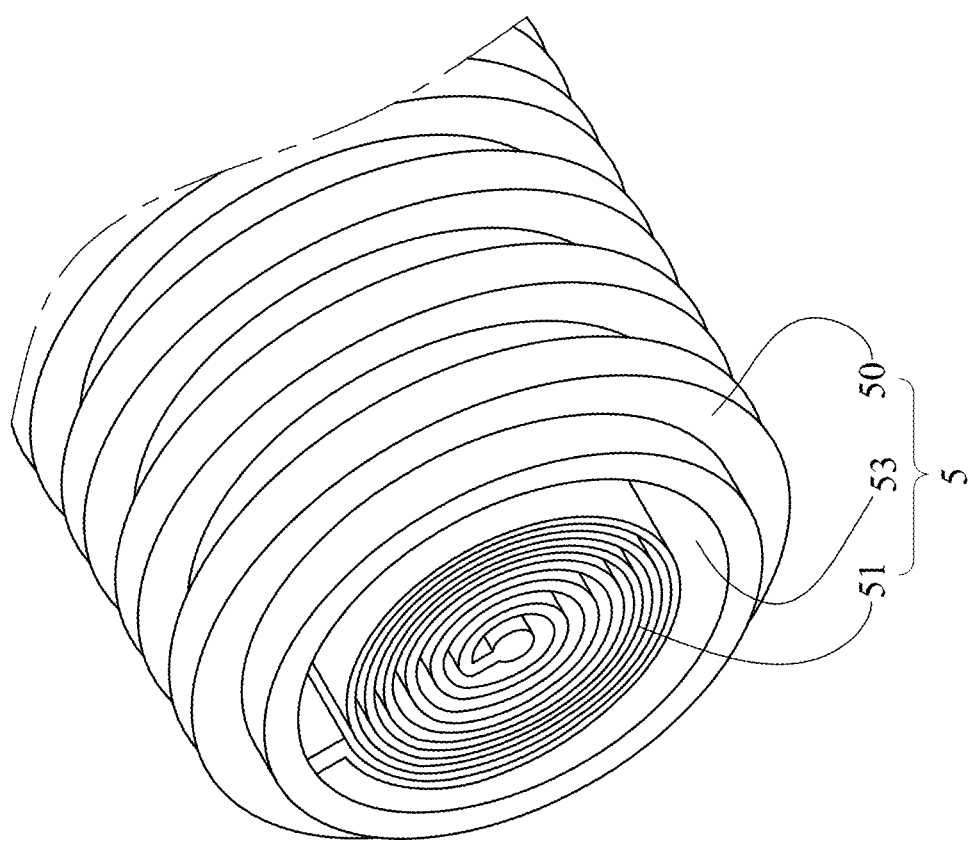
FIG. 9B is a partial sectional view of a connecting unit used in the smart mechanical component of the third embodiment.

Please refer to FIG. 9A and FIG. 9B, which are schematic diagrams showing a sectional view and a partial view of a smart mechanical component according to a third embodiment of the present disclosure. In this third embodiment, the smart mechanical component is comprised of: a main body 50, at least one connecting unit 51 and a secondary body 52.

The secondary body 52 is disposed inside the main body 50 while allowing a three-dimensional (3-D) reserved space 53 to be formed between the main body 50 and the secondary body 52, and thereby a capacitor can be achieved from the assembly of the main body 50, the secondary body 52 and the three-dimensional (3-D) reserved space 53. In the third embodiment, the main body 50 is a screw rod or a slide rail.

The at least one connecting unit 51 that is provided for connecting the secondary body 52 to the main body 50 is connected to at least two ends of the main body 50. The reason why there is a need for more than one connecting units 51 is to maintain the overall structural integrity when the main body 50 is too long. Similarly, the at least one connecting unit 51 is substantially an inductor itself that is to be used cooperatively with the aforesaid capacitor to construct an LC circuit5.

Figure 10:
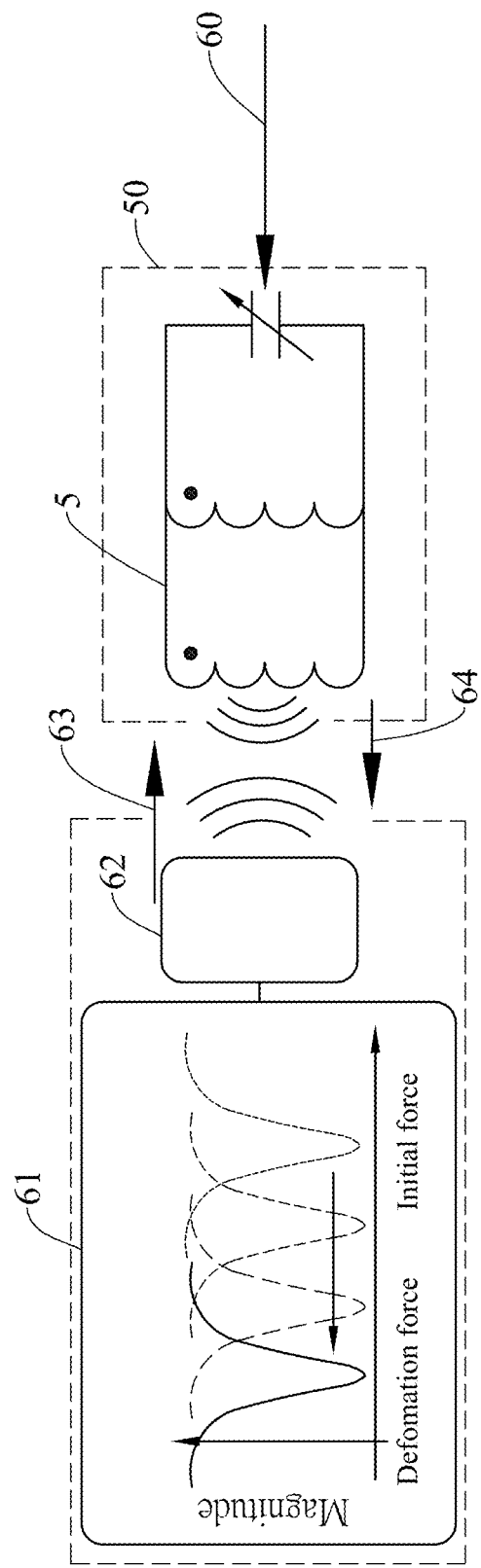
FIG. 10 is a schematic diagram showing the sign communication between a signal reader and the smart mechanical component of the third embodiment.

In FIG. 10, there are two connecting units so that the so-achieved LC circuit5 is a circuit with two inductors. In FIG. 10, a reader is provided, which is composed of a frequency scanner 61 and a radiofrequency coil 62. The frequency scanner 61 is enabled to provide an energy 63 to the main body 50 via the radiofrequency coil 62. Operationally, when an external force 60 is exerted upon the main body 50, the reader will be activated to fed the energy 63 to the LC circuit5 for enabling the LC circuit5 to response back a reflection energy 64 carrying resonance frequency information of the LC circuit5 to be detected by the frequency scanner 61 of the reader. Similar to those disclosed in FIG. 3 to FIG.5, the variation of resonance frequency that is disclosed in FIG. 6 also indicates that the smart mechanical component is deformed by the external force, and when the resonance frequency can no longer be detected, it represents that the deform of the smart mechanical component is too large that the smart mechanical component is damaged.

Figure 11A:
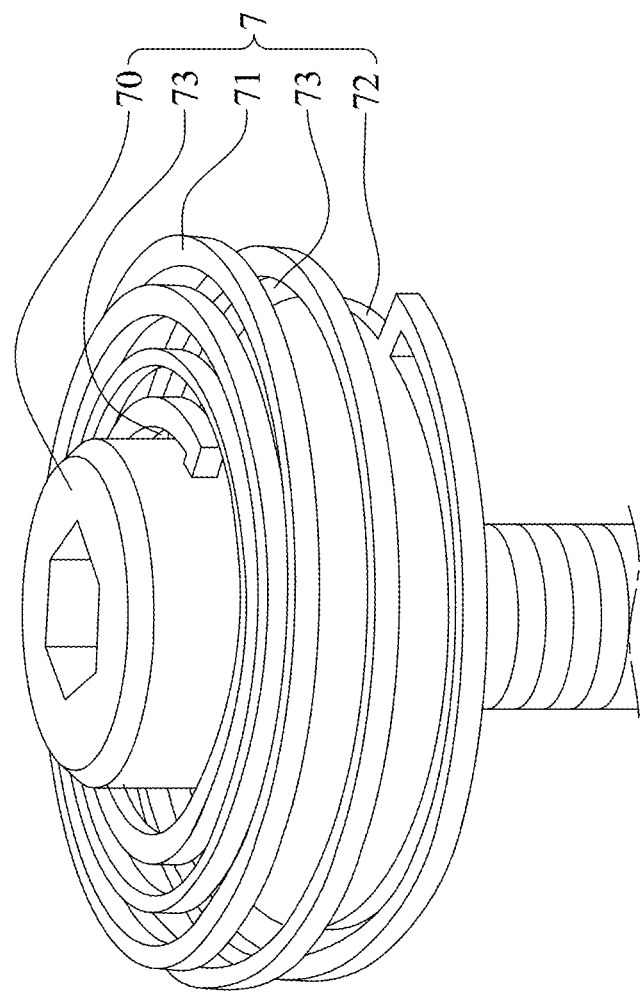
FIG. 11A is a sectional view of a smart mechanical component according to a fourth embodiment of the present disclosure.
Figure 11B:
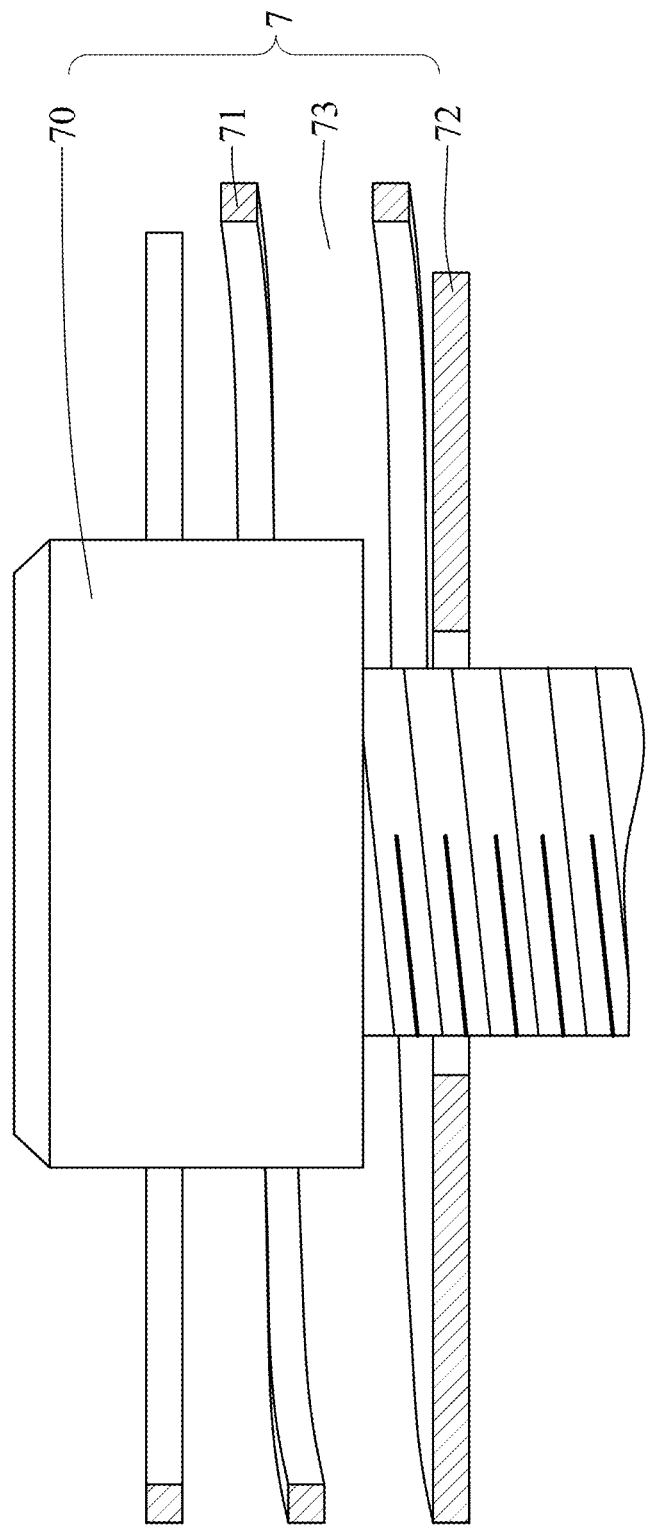
FIG. 11B is a partial sectional view of the smart mechanical component according to the fourth embodiment of the present disclosure.

Please refer to FIG. 11A and FIG. 11B, which are schematic diagrams showing a sectional view and a partial view of a smart mechanical component according to a fourth embodiment of the present disclosure. In this fourth embodiment, the smart mechanical component is comprised of: a main body 70, a connecting unit 71 and a secondary body 72.

The main body 70 is arranged boring through the secondary body 72, and the connecting unit 71 is provided for connecting the main body 70 to the secondary body 72. Similar, there is a three-dimensional (3-D) reserved space 73 formed at a position between the main body 70 and the secondary body 72, and thereby a capacitor can be achieved from the assembly of the main body 70, the secondary body 72 and the three-dimensional (3-D) reserved space 73. Moreover, the connecting unit 71 is substantially an inductor itself that is to be used cooperatively with the aforesaid capacitor to construct an LC circuit7. In this embodiment, the main body 70 is a peg, while the secondary body 72 can be a pad designed for the peg, and the connecting unit 71 can be a coil.

When the peg, i.e. the main body shown in the fourth embodiment of FIG. 11A, is fastened to the spine of a human body, the secondary body 72 is engaged to the main body 70, and thereby a short-circuit condition is caused for enabling the resonance frequency of the LC circuit7 to be destroyed. On the other hand, when the peg is loosened while allowing the main body 70 to disengage itself from the secondary body 72, the resonance frequency of the LC circuit7 is detectable. Consequently, the status of the peg relating to whether it is fastened or loosened can be detected and determined according to the measurement of the resonance frequency.

To sum up, the present disclosure provides a smart mechanical component capable of determining whether there is any of its parts is required to be replaced by the detection of a resonance effect from an inductor-capacitor (LC) circuit built inside the mechanical component.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A smart mechanical component, comprising:
   a main body, wherein the main body is a screw or a hook;
   a secondary body, wherein the secondary body is an inner shaft furnished in the main body, and the main body is not in contact with the secondary body;
   a three-dimensional (3-D) reserved space, positioned between the main body and the secondary body; and
   an inductor bridged between the main body and the secondary body and located adjacent to a head part of the main body, wherein the inductor has a spiral shape, a center end of the inductor connects to an end of the inner shaft, and a spiral end of the inductor connects to the screw or the hook, for connecting the main body and the secondary body;
   wherein, the main body, the secondary body and the three-dimensional (3-D) reserved space form a capacitor, and the inductor and the capacitor to form an inductor-capacitor (LC) circuit; and
   wherein the secondary body extends from one end of the main body to another end of the main body, and the secondary body is coaxial to the main body.

2. The smart mechanical component of claim 1, wherein the main body, the secondary body and the inductor are integrally formed or are laminated together.

3. The smart mechanical component of claim 1, wherein a film is formed on the surfaces of the main body, the secondary body and the inductor.

4. The smart mechanical component of claim 1, wherein a magnetic material is disposed surrounding the inductor.

5. The smart mechanical component of claim 1, wherein the three-dimensional (3-D) reserved space is filled or partially filled with a dielectric material.

6. The smart mechanical component of claim 1, wherein the three-dimensional (3-D) reserved space is designed to be adjustable by a driving of an external force or by a use of a regulator.

7. The smart mechanical component of claim 1, wherein the LC circuit is provided for allowing its resonance frequency or quality factor of resonance to be readable by a reader.

8. The smart mechanical component of claim 1, wherein the inductor is connected to at least two ends of the main body.

9. The smart mechanical component of claim 1, wherein the main body, the secondary body and the inductor are electrical conductors.

10. The smart mechanical component of claim 1, wherein the inductor is substantially a coil.

11. A smart mechanical component, comprising:
- a secondary body, wherein the secondary body is a pad with a hole in the center;
- a main body, wherein the main body is a screw furnished by penetrating through the hole of the secondary body, and the main body is not in contact with the secondary body; and
- an inductor bridged between the main body and the secondary body and having a spiral shape, wherein a spiral end of the inductor connects to a periphery of the pad, and a center end of the inductor connects to a head part of the screw, for connecting the main body and the secondary body;
- wherein, a three-dimensional (3-D) reserved space is formed between the main body and the secondary body; the secondary body, the main body and the three-dimensional (3-D) reserved space form a capacitor, and the inductor and the capacitor form an inductor-capacitor (LC) circuit.

12. The smart mechanical component of claim 11, wherein the main body is a component selected from the group consisting of: a screw, a bolt, a screw rod, a slide rail, a peg or a hook.

13. The smart mechanical component of claim 11, wherein the main body, the secondary body and the inductor are integrally formed or are laminated together.

14. The smart mechanical component of claim 11, wherein there is a film is formed on the surfaces of the main body, the secondary body and the inductor.

15. The smart mechanical component of claim 11, wherein the three-dimensional (3-D) reserved space is designed to be adjustable by a driving of an external force or by a use of a regulator.

16. The smart mechanical component of claim 11, wherein the LC circuit is provided for allowing its resonance frequency or quality factor of resonance to be readable by a reader.

17. The smart mechanical component of claim 11, wherein the main body, the secondary body and the inductor are electrical conductors.

18. The smart mechanical component of claim 11, wherein the inductor is substantially a coil.

19. The smart mechanical component of claim 11, wherein magnetic material is disposed surrounding the inductor.

20. The smart mechanical component of claim 11, wherein the three-dimensional (3-D) reserved space is filled or partially filled with a dielectric material.

* * * * *